United States Patent [19]

Virden

[11] 4,025,099
[45] May 24, 1977

[54] WHEELED CART WITH CABLE PROTECTION ATTACHMENT

[76] Inventor: Herbert H. Virden, 6533 High Drive, Shawnee Mission, Kans. 66208

[22] Filed: Jan. 2, 1976

[21] Appl. No.: 646,260

[52] U.S. Cl. .............................. 293/58; 16/18 CG; 280/79.3; 280/160
[51] Int. Cl.² ................. B60R 19/00; B60B 33/00; B62B 5/00
[58] Field of Search ........... 174/1; 16/18 R, 18 CG; 56/17.4; 280/43.24, 79.3, 150 R, 160, 160.1; 293/58, 38, 42, 44

[56] References Cited
UNITED STATES PATENTS

| | | | |
|---|---|---|---|
| 841,651 | 1/1907 | Lane | 293/58 |
| 1,007,878 | 11/1911 | Krell | 280/160 |
| 1,295,692 | 2/1919 | Cantlon | 293/58 |
| 1,408,815 | 3/1922 | McKasty | 280/160 |
| 2,450,062 | 9/1948 | Voss et al. | 16/18 CG |
| 3,432,183 | 3/1969 | Groll | 56/17.4 X |

*Primary Examiner*—Laramie E. Askin
*Attorney, Agent, or Firm*—Lowe, Kokjer, Kircher, Wharton & Bowman

[57] ABSTRACT

A cable protecting device is attached to the wheel yoke of a cart equipped with swivel wheels. The device has a fender strap located forwardly of the cart wheel with same being connected to the wheel yoke at its upper end and further supported by a pair of braces at its lower end. A cable lifting plate is hinged to the lower end of the fender and extends to the floor level so that its leading end may receive and lift a cable encountered by the cart.

3 Claims, 2 Drawing Figures

WHEELED CART WITH CABLE PROTECTION ATTACHMENT

BACKGROUND AND SUMMARY OF THE INVENTION

This invention relates generally to an attachment for wheeled carts and more particularly to a device that serves to lift cables out of the way of the wheels. There are a number of situations in which the movement of carts carrying various types of equipment is impeded by the cables and wires that are associated with the equipment. Electrical apparatus, medical instruments, television cameras and monitors, and similar equipment have cables that often lie on the floor as the cart and equipment is moved thereon. As a result, the cables either impede the cart movement or become damaged when the cart runs over them.

Attempts have been made at using small diameter or flat cables, but the cables are still run over by the cart and subjected to impact and continual wear. Other attempts have been made at using larger wheels on the cart to reduce the obstruction. However, this concept requires additional expense in the wheel construction, and again does not prevent the cables from being run over. At the present time, the electrical, and more particularly T.V., cables are usually simpled pulled out of the way by hand thereby resulting in an inconvenient and time consuming task which can seriously impair the efficiency of the operator.

It is a primary object of the present invention to provide a device for preventing electrical cables and the like from catching on or under the wheels of a cart carrying the attached apparatus as it is rolled along the floor.

Another object of the invention is to provide a device of the character described which receives and lifts cables encountered by the wheels in order to prevent cables on the floor from being run over by the cart.

A further object of the invention is to provide a device of the character described that is adapted for firm attachment to the yoke of a swivel castor type wheel.

A still further object of the invention is to provide a device of the character described having a portion thereof that rides on the floor ahead of the wheel in order to readily receive a cable, and yet is constructed so as not to damage or be caught up on the floor.

An additional object of the invention is to provide a device of the character described that includes a cable lifting plate which is hingedly supported in order to easily follow the contour of the floor.

Another important object of the invention is to provide a device of the character described that is economically constructed and easily attached to either existing equipment carrying carts or when the carts are manufactured.

Other and further objects of the invention, together with the features of novelty appurtenant thereto, will appear in the course of the following description.

DETAILED DESCRIPTION OF THE INVENTION

Figure 1:
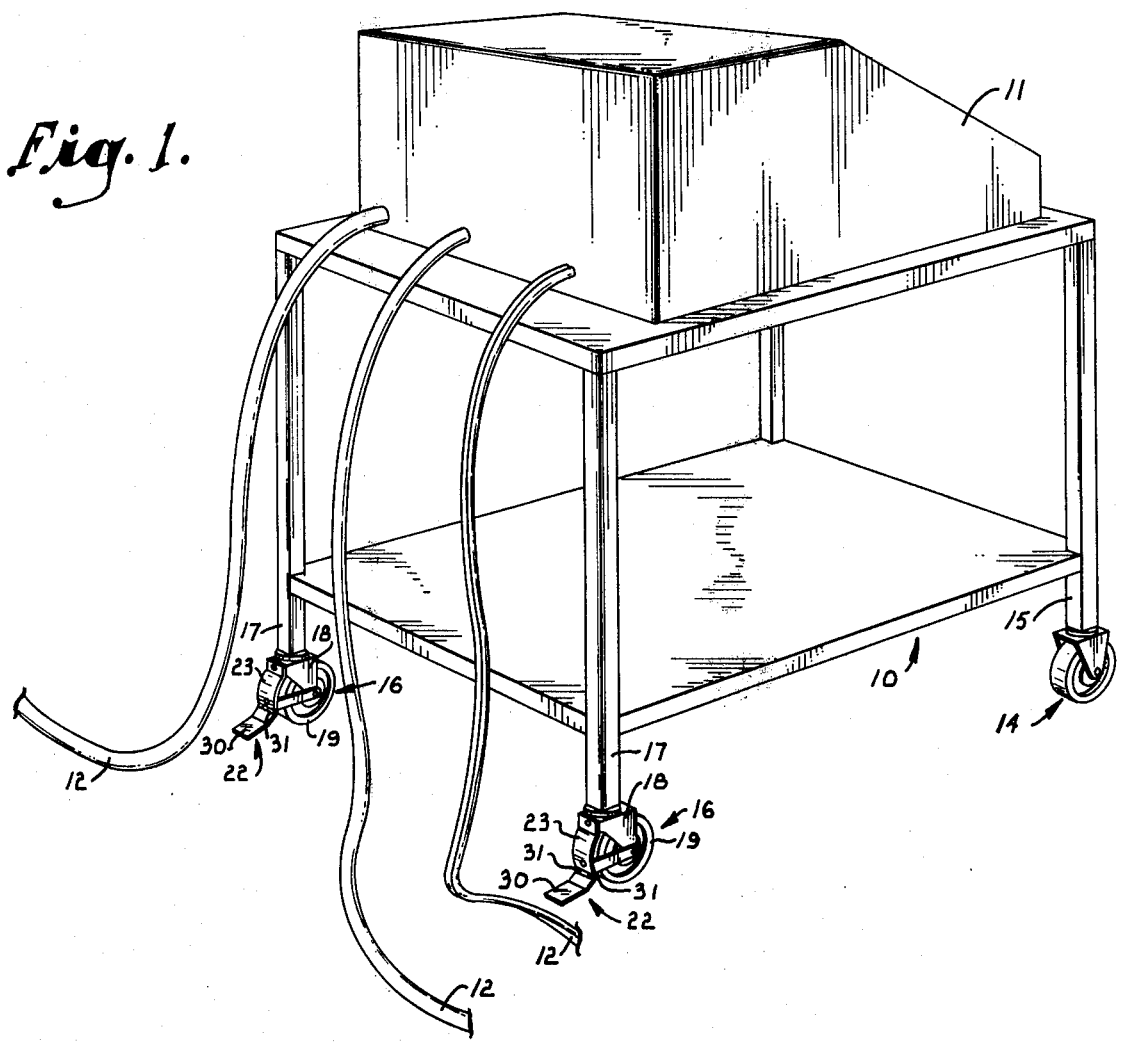
Figure 2:
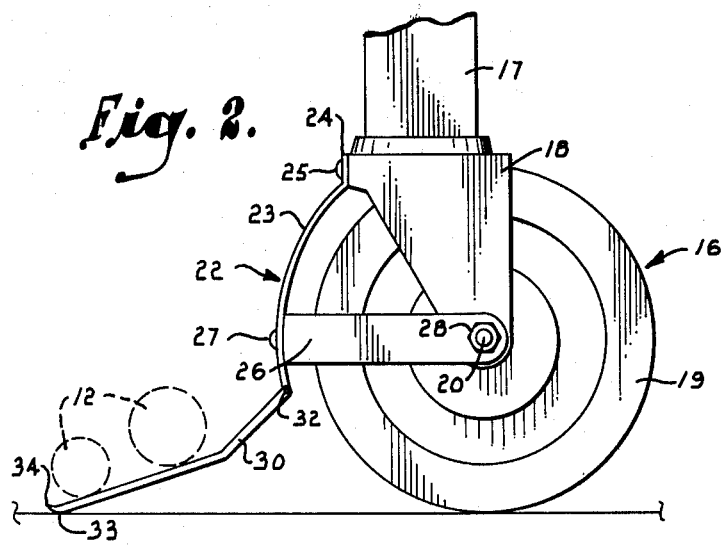

In the accompanying drawing which accompanies the specification and is to be read in conjunction therewith, and in which like reference numerals are employed to indicate like parts in the various views:

FIG. 1 is a perspective view of a typical wheeled cart with a cable lifting device constructed according to the present invention attached to each front wheel of the cart; and FIG. 2 is a fragmentary side elevational view on an enlarged scale illustrating the cable lifting device shown in FIG. 1 as it is attached to one of the front wheels of the cart.

Referring now to the drawing in detail, FIG. 1 illustrates a cart 10 on which equipment such as television, X-Ray, or other electrical monitoring unit 11 is carried. In any event, unit 11 may be of any type which has cables 12 or the like extending from and lying along the floor. Cart 10 is illustrated as a conventional four-wheeled cart having a pair of rear wheel assemblies 14 mounted for swivelling movement on the lower ends of rear legs 15. A pair of front wheel assemblies 16 are likewise mounted for swivel movement on the lower ends of front legs 17.

Referring now to FIG. 2, one of the front wheel assemblies 16 is illustrated in detail. A wheel yoke 18 is mounted in a well known manner to swivel on the lower end of leg 17 about a vertical axis. Of course, wheel 19 is mounted within yoke 18 for rotation about a horizontal axle 20. Usually, axle 20 will be offset from leg 17, so that the wheel will always tend to swivel to the position of FIG. 2 (with axles 20 located behind leg 17) when the cart is rolled forwardly.

The cable lifting device is generally designated by numeral 22. This device serves to lift cables 12 in a manner to prevent them from being run over or caught beneath the wheels of cart 10. Contoured fender 23 is preferably constructed of a sturdy material such as stainless steel. Its upper end portion (flange 24) is connected to the forward upper portion of yoke 18 by a screw 25 or by any other conventional connecting means such as spot welding or utilization of a snap ring collar (not shown). As suggested, fender 23 is curved in shape generally in accordance with the curvature of wheel 19, with the fender being spaced forwardly of the wheel a sufficient distance so as not to interfere therewith.

A pair of braces 26 comprising thin metal plates have inturned flanges (not shown) on their forward ends which are secured to fender 23 by a screw 27 at a point somewhat above the lower end thereof. The respective braces 26 extend generally horizontally on opposite sides of the wheel and are attached at their rearward ends to opposite sides of yoke 18. Openings in the braces are fit over axle 20 and secured thereto by threading nuts 28 onto the ends of the axles. The braces 26 assist in mounting fender 23 on yoke 18 and maintain the fender in fixed position.

A metal flipper plate 30 acts to receive and lift cables and wires out of the way of the wheels of the cart. The lower end of fender 23 and the upper end of flipper plate 30 are provided with aligned hinge barrels 31 (FIG. 1) in which a horizontal hinge pin 32 is inserted to mount flipper plate 30 for hinged movement. This hinge connection permits plate 30 to freely pivot about the horizontal axis of pin 32, with the weight of the plate continuously urging it downwardly.

Flipper plate 30 extends generally forwardly and downwardly from the hinge connection and is bent at a location slightly above its midpoint so that its lower portion is inclined to a lesser extent than its more sloping upper portion. Due to the hinge mounting of plate 30, the weight of the plate urges its leading or forward end downwardly at all times against or at least near the floor level. This leading end of plate 30 is smoothly curved at 33 on its underside. The curved surface 33 is the only part of the plate that would ordinarily engage the floor. Furthermore, its smooth curvature provides low friction contact so as not to scratch the floor or become caught thereon should it come into contact with the floor.

In any event, the underside of the flipper plate continues to curve upwardly forwardly of surface 33, with the extreme terminal edge of the plate tapering to a sharp edge at 34. Edge 34 is spaced above the floor, preferably a distance of approximately 1/32 inch, and approximately ⅜ inch or ½ inch forwardly of the portion of surface 33 that contacts the floor. While edge 34 does not come in contact with the floor, it is low enough to readily receive a cable.

In use, one of the cable lifting devices 22 is mounted on each of the front wheel yokes 18. When cart 10 is rolled along the floor and encounters a cable, the leading edge 34 of plate 30 always contacts the cable before the front wheels since the wheels swivel in such a manner to always direct it forwardly of the cart. The forward cart movement inserts edge 34 of plate 30 beneath the cable. As the cart advances further, the cable is received on the upper surface of the plate. Thereafter, the cable remains on plate 30 and is pushed ahead of the cart so as not to be caught on the wheels or run over. As shown in FIG. 2, plate 30 is preferably of sufficient size to receive a number of cables although the cables normally do not move upwardly on the plate above the bend line thereof. In any case, fender 23 covers the front portion of wheel 19 and prevents the cables from contacting the wheel no matter how many cables or wires are picked up on plate 30.

It is noted that the hinge connection of plate 30 assures that its leading end always contacts the floor. This feature coupled with the rounded surface 33 permits a plate to easily follow the contour of even a rough undulating floor. In addition, the sharp edge 34 and its spacing above the floor, permits plate 30 to pick up a cable more easily than would be the case with a blunt edge.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a wheeled cart having a wheel yoke supported to swivel about a substantially vertical axis, a wheel mounted on the yoke to swivel therewith, and a substantially horizontal axle on which the wheel is mounted for rotation, the combination therewith of:

a fender comprising a thin strip having an upper end portion and a lower end portion with said upper end portion being secured directly to the wheel yoke, said fender being spaced forwardly of the wheel;

at least one rigid brace having opposite ends respectively secured to said axle and to said fender in proximity to the lower end portion thereof; and a cable lifting plate connected at one end to said fender at the lower end portion thereof for free pivotal movement about a substantially horizontal pivot axis with the weight of said plate urging same downwardly about said pivot axis in a manner to position a leading end of said plate in yieldable contact with the floor surface on which the wheel travels, said plate having an upper surface for receiving and lifting a cable from the floor surface out of the way of the wheel.

2. The combination set forth in claim 1 including a second rigid brace having opposite ends respectively secured to said axle and to said fender in proximity to the lower end portion thereof, the first and second braces being located on opposite sides of the wheel in a substantially parallel relationship to one another.

3. The combination set forth in claim 1 wherein the upper surface of said cable lifting plate has a bend therein to present an upper portion of said surface which is more steeply inclined than the lower portion, whereby a cable tends to remain on said lower portion.

* * * * *